May 3, 1927.  1,627,198
E. C PÉNIN
FILM WINDING AND UNWINDING DEVICE FOR MOTION PICTURE APPARATUS
Filed April 22, 1924   2 Sheets-Sheet 1
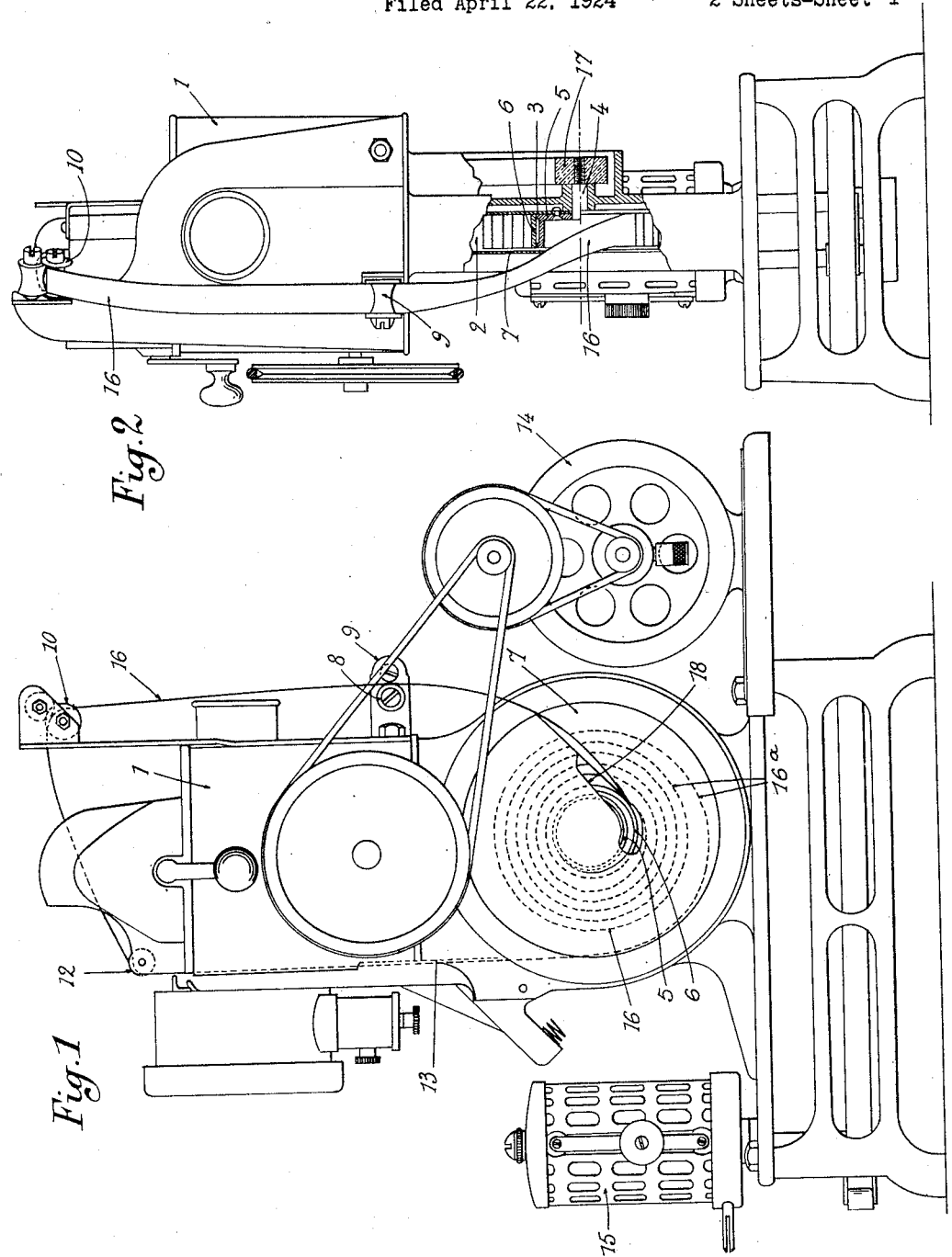
Emile Christian Pénin
INVENTOR May 3, 1927.

E. C PÉNIN 1,627,198

FILM WINDING AND UNWINDING DEVICE FOR MOTION PICTURE APPARATUS

Filed April 22, 1924   2 Sheets-Sheet 2

Emile Christian Pénin
INVENTOR;
By (signature)
his Attorney.

Patented May 3, 1927.

1,627,198

UNITED STATES PATENT OFFICE.

EMILE CHRISTIAN PÉNIN, OF JOINVILLE-LE-PONT, FRANCE, ASSIGNOR TO PATHE CINEMA, ANCIENS ETABLISSEMENTS PATHE FRERES, OF PARIS, FRANCE.

FILM WINDING AND UNWINDING DEVICE FOR MOTION PICTURE APPARATUS.

Application filed April 22, 1924, Serial No. 708,109, and in France, January 15, 1924.

The present invention relates to motion picture apparatus and in particular to projection apparatus comprising a storage chamber having a preferably circular shape and adapted to receive the film as it is projected on the screen. The said invention chiefly relates to a device for drawing forward the portion of the film which has already passed before the lens and has entered the circular storage chamber, whereby the said portion of the film is caused to move forward in a regular manner within the storage chamber.

One of the particular features of the invention consists in the fact that a revoluble core is disposed within the said storage chamber, said core having mounted thereon a ring which is loose upon the same and is in contact with the film, the said ring is driven forward by friction upon the core, so that the film will be drawn forward by the ring and will thus be wound upon the latter.

Other features of the invention will be hereinafter set forth:

The appended drawings show by way of example two embodiments of the invention. In the first embodiment, the device serves for the simultaneous winding and unwinding of an endless film; in the second embodiment the said device is used for winding a usual film having two disconnected ends.

Figure 3:
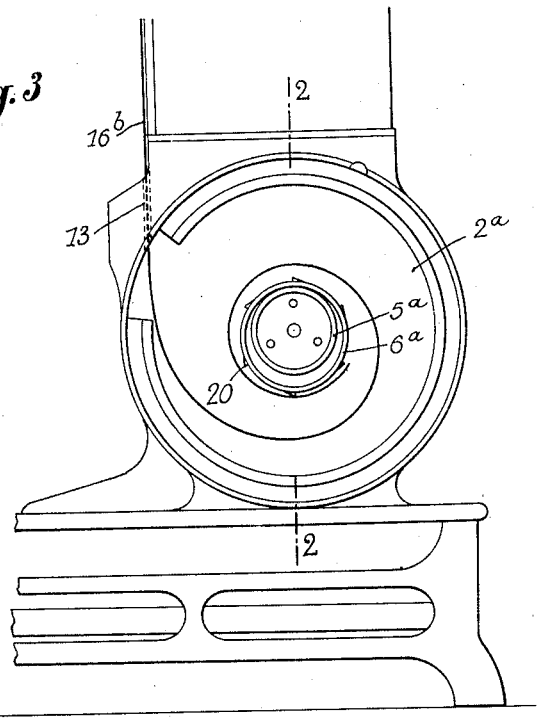
Figure 4:
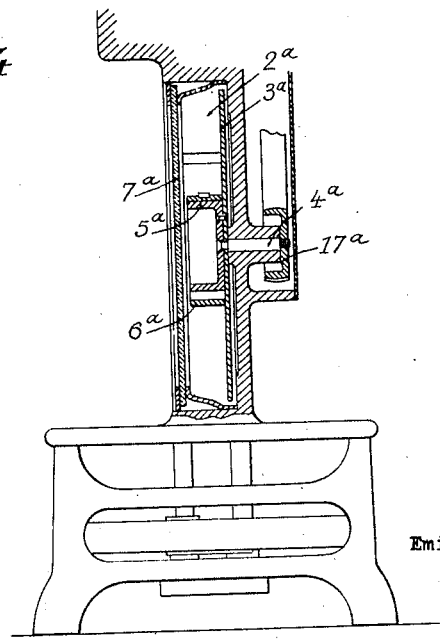

Fig. 1 is a front elevation of a motion picture apparatus for the projection of an endless film, Fig. 2 is the corresponding side elevation, Fig. 3 is a front elevation of the storage chamber of a motion picture apparatus for the projection of a film having two separate ends, And Fig. 4 is a section of the same on the line 2—2 (Fig. 3).

In Figs. 1 and 2, 1 is the casing containing the mechanism for drawing forward the film in a continuous or an intermittent manner, and also containing the projection mechanism; both of these mechanisms are of any known type and do not form part of the invention. 2 is the storage chamber; the film enters the same at the periphery and comes out at the centre. The said chamber is preferably circular, and contains a vertical disc 3 secured to the shaft 4, the chamber being closed by the plate 7 which is preferably removable and is provided with an aperture 18 for the exit of the film 16. To the said shaft 4 is keyed the pulley 17 which is driven by an electric motor 14 controlled by a rheostat 15. To the disc 3 is secured a cylindrical member or core 5 upon which bears the ring 6; the internal diameter of the said ring is larger than the external diameter of the core 5, whereby the ring is enabled to turn loosely upon the said drum.

The two ends of the film being cemented together, the said film comes out of the chamber through the aperture 18, travels in a closed circuit upon the guide rollers 8, 9, 10, 11, 12, then engaging in the film gate and in the passage 13 and returning thence into the chamber 2 in which it winds automatically upon the ring 6 in a loose coil.

Since the shaft 4 is driven by the motor 14, the coil or bobbin within the chamber is drawn forward by the friction of the edge of the film upon the disc 3 and also by the adhesion of the inner spiral turn of the film to the ring 6 which is driven forward by friction upon the core 5. The said disc is rotated at a greater speed than the bobbin which slips upon the disc, the actual speed of the film depending upon the action of the driving device contained within the casing 1.

In this manner the storage chamber serves both for the winding and the unwinding of the film, and the use of the ring 6 for drawing forward the film will facilitate the exit of the film from the chamber and will further the winding of the outer turns 16ª. With the said device, the film can be made to travel in a given direction through the apparatus—continuously or not—as many times as desired, this being limited only by the wear of the film, and no outside intervention is required.

In the apparatus shown in Figs. 3 and 4, the above-mentioned elements are still employed, such as the main chamber 2ª, the disc 3ª mounted on the shaft 4ª which is driven by the pulley 17ª and rotates within the chamber, the core 5ª secured to the said disc, and the loose ring 6ª; the storage chamber is closed by the removable plate 7ª.

But in the said apparatus the film 16ᵇ is a straight film with disconnected ends, one end of the film being attached to the feeding drum, not shown, and the other end entering the chamber 2ª.

At the time of starting the apparatus, the end of the film is brought out of the passage 13, enters the chamber 2ᵃ and comes into contact with the outer surface of the ring 6ᵃ. Since the disc 3ᵃ and consequently the core 5ᵃ are in rotation, the ring 6ᵃ will be drawn forward by friction upon the said core. In these conditions, the film in contact with the ring is drawn forward by the latter and will be brought around the said ring; it will then form successive spiral turns while becoming tightened upon the ring and finally forming a compact mass with the same, and in this manner the film is wound in a roll or bobbin.

To facilitate the travel of the film by its contact with the said ring, indentations 20 may be provided upon the periphery of the ring, or the latter may be faced with india rubber or like substance furthering the adhesion of the film.

In Figs. 3 and 4 the travel of the film is also facilitated by the friction of its edge upon the revoluble disc 3ᵃ, and to increase the frictional effect the said disc may be placed in the inclined or the horizontal position.

Obviously, the said invention is not limited to the constructional forms hereinbefore described, but is susceptible of various modifications without departing from the scope of the invention.

Having now described our invention, what we claim as new and desire to secure by Letters Patent is:

1. In a motion picture apparatus, a storage chamber situated below the feeding mechanism, a substantially horizontal core rotatably mounted within said chamber, means for rotating said core, a ring loosely supported on said core and adapted to be driven by said core by the mere action of gravity, and means for feeding the film into said chamber between the two transversal planes containing the side faces of said ring and parallelly to the axis of the core, whereby the film by engaging the outer surface of the ring is drawn forward within said chamber and spirally turned round said ring.

2. In a motion picture apparatus for the projection of an endless film, a storage chamber situated below the feeding mechanism, said chamber being provided with a side aperture for the exit of the film, a substantially horizontal core rotatably mounted with said chamber, means for rotating said core, a ring loosely supported on said core and adapted to be driven by said core by the mere action of gravity, means for feeding the film into said chamber between the two transversal planes containing the side faces of said ring and parallelly to the axis of the core, whereby the film by engaging the outer surface of the ring is drawn forward within said chamber and spirally turned round said ring and means for guiding the part of the film located immediately on the outer surface of said ring towards the side aperture of said chamber.

3. In a motion picture apparatus, a storage chamber situated below the feeding mechanism, a substantially horizontal core rotatably mounted within said chamber, means for rotating said core, a ring loosely supported on said core and adapted to be driven by said core by the mere action of gravity, a vertical revoluble disc mounted on said core near one lateral face of said ring and means for feeding the film into said chamber between the two transversal planes containing the side faces of said ring and parallelly to the axis of the core, whereby the film by engaging the outer surface of the ring and one face of said disc is drawn forward within said chamber and spirally turned round said ring.

4. In a motion picture apparatus, a storage chamber situated below the feeding mechanism, a substantially horizontal core rotatably mounted within said chamber, means for rotating said core, a ring loosely supported on said core and adapted to be driven by said core by the mere action of gravity, frictional means provided on the outer surface of said ring and means for feeding the film into said chamber between the two transversal planes containing the side faces of said ring and parallelly to the axis of the core, whereby the film by engaging the outer surface of the ring is drawn forward within said chamber and spirally turned round said ring.

In testimony whereof I have signed my name to this specification.

EMILE CHRISTIAN PÉNIN.